United States Patent
Wallner

(10) Patent No.: US 6,184,639 B1
(45) Date of Patent: Feb. 6, 2001

(54) ELECTRIC MOTOR

(75) Inventor: Herbert Wallner, Schönaich (DE)

(73) Assignee: Dr. Fritz Faulhaber GmbH & Co. KG (DE)

( * ) Notice: Under 35 U.S.C. 154(b), the term of this patent shall be extended for 0 days.

(21) Appl. No.: 09/288,056

(22) Filed: Apr. 7, 1999

(30) Foreign Application Priority Data

Apr. 9, 1998 (DE) .............................................. 198 15 964

(51) Int. Cl.$^7$ ..................................................... H01R 39/46

(52) U.S. Cl. ........................... 318/439; 318/254; 318/138

(58) Field of Search ..................................... 318/254, 138, 318/439

(56) References Cited

U.S. PATENT DOCUMENTS

| | | | |
|---|---|---|---|
| 5,444,479 | * | 8/1995 | Fernekes et al. ..................... 318/254 |
| 5,821,651 | * | 10/1998 | Fernekes et al. ..................... 318/254 |
| 5,982,297 | * | 11/1999 | Welle ................................... 318/254 |

* cited by examiner

*Primary Examiner*—Karen Masih
(74) *Attorney, Agent, or Firm*—Robert W. Becker & Associates

(57) ABSTRACT

An electric motor, having a coil without iron-core and having an integrated electronic control device, has a sine commutator supplying the electric motor with sine-shaped currents or voltages. The control device has an rpm control with which a magnitude of the sine-shaped currents or voltages is preset. The electronic control device also has a position control for the motor shaft.

21 Claims, 3 Drawing Sheets

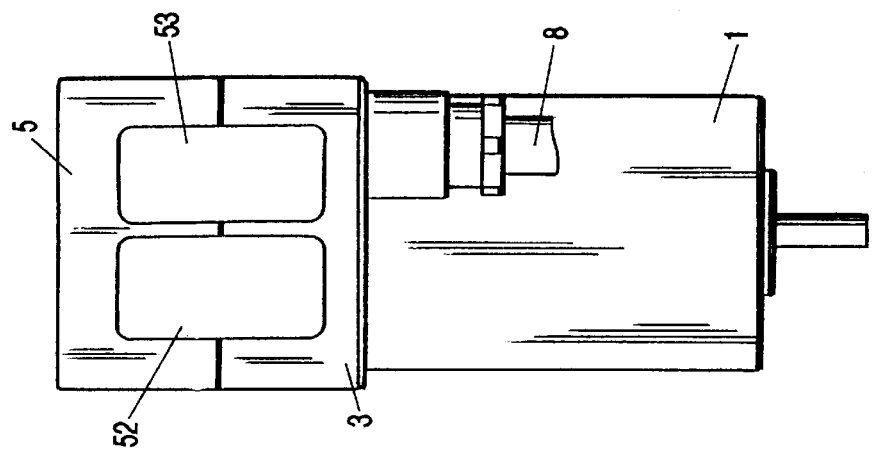
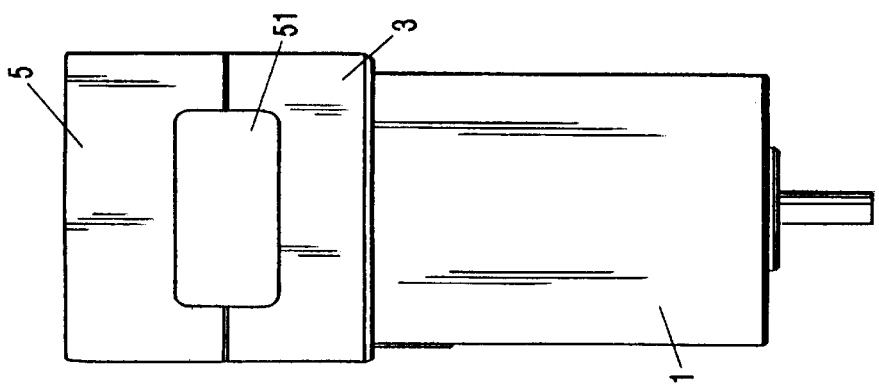
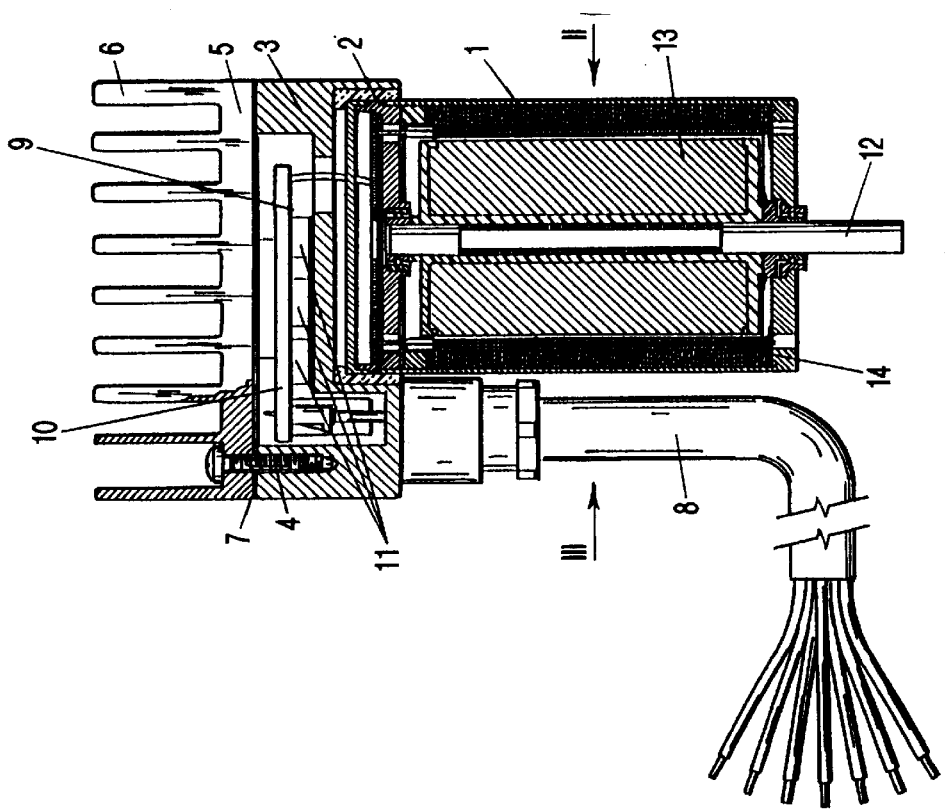

ELECTRIC MOTOR

BACKGROUND OF THE INVENTION

The invention relates to an electric motor having an integrated electronic control device.

Electric motors are known with which, for example, in machine tools carriages are driven in order to feed the carriages, for example, quickly to the machining location and then switch over to the advancing speed for machining the work piece. The electronic control device provided for rpm control is a component separate from the electric motor so that the mounting of such a drive requires considerable mounting space which is often not available.

There are also electric motors known which are of a small size and which already have an integrated electronic control device. Such motors, however, exhibit considerable moment fluctuations so that an exact rpm (revolutions per minute) control is not obtainable.

It is therefore an object of the invention to embody the aforementioned electric motor such that a very precise rpm control is possible while the motor has a small size.

SUMMARY OF THE INVENTION

This object is inventively solved forthe aforementioned electric motor by supplying the electric motor with sine-shaped currents or voltages.

The inventive electric motor is supplied with sine curve-shaped currents or voltages, and the sine commutation results in a reduction of the moment fluctuations to a minimum so that a very precise rpm control is possible in a simple manner. Furthermore, the inventive electric motor exhibits a very quiet and synchronous run for smallest rpm.

The actual value transducer for the commutation, the rpm, and also for the position of the motor shaft are advantageously in the form of linear Hall sensors which are simple and inexpensive components.

Further features of the invention will result from the further claims, the description, and the drawings.

BRIEF DESCRIPTION OF THE DRAWINGS

The invention will be explained in more detail with the aid of the drawings showing an embodiment of the invention. It is shown in:

FIG. 1 an axial section of the inventive electric motor;

FIG. 2 a view in the direction of arrow II in FIG. 1;

FIG. 3 a view in the direction of arrow III in FIG. 1;

DESCRIPTION OF PREFERRED EMBODIMENTS

Figure 4:
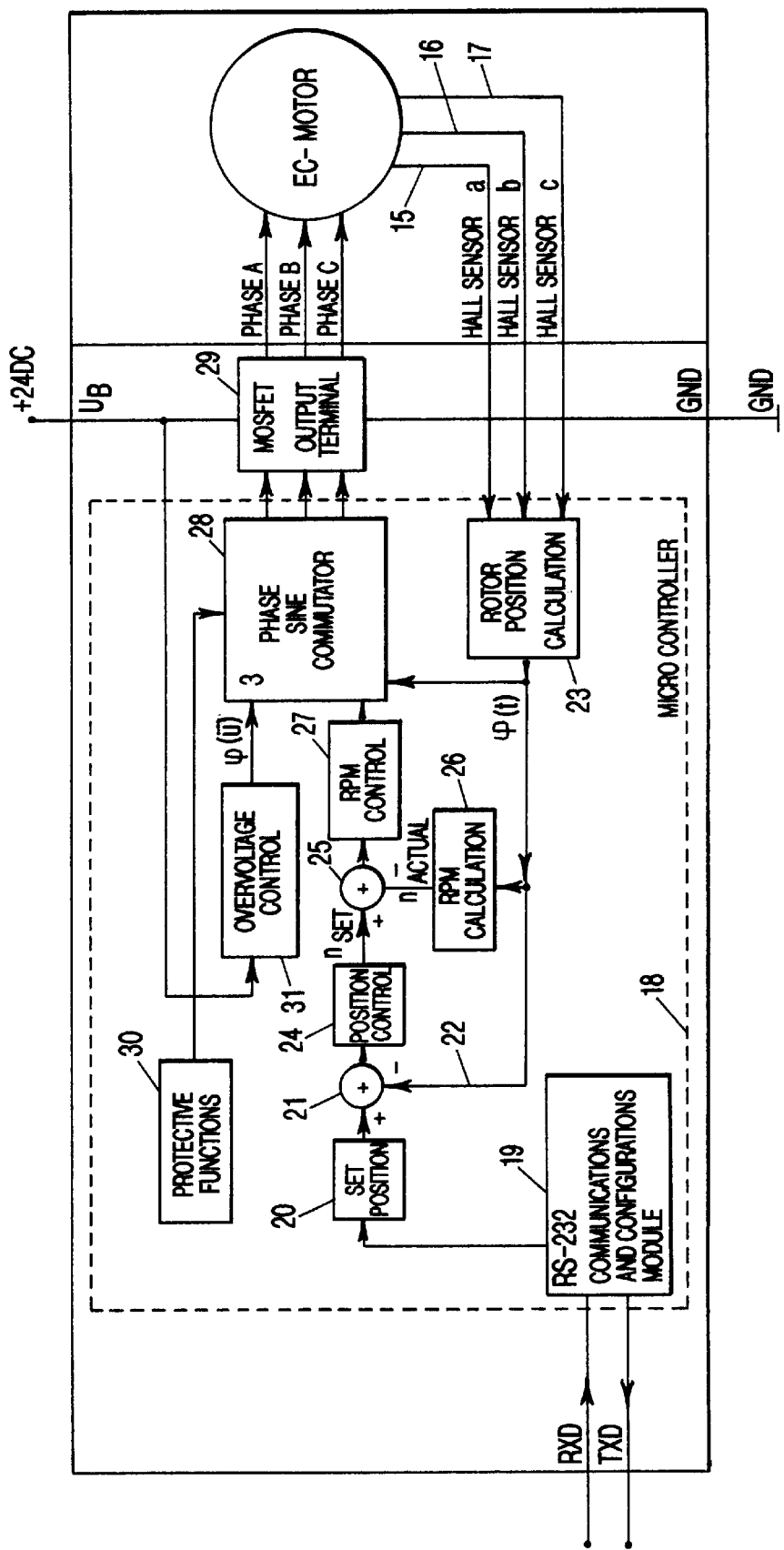
FIG. 4 a block diagram of the position control mode of the inventive electric motors.

The electric motor is a brushless motor having a coil without iron-core and further having integrated position and rpm control. It is characterized by a sine commutation, which reduces moment fluctuations to a minimum and ensures a very smooth run. The electric motor is controlled by a digital four quadrant control which results in a highly dynamic drive with excellent properties. A programable current control makes it possible to realize in addition a moment limitation. The electric motor has very compact dimensions and can be used in any situation where a great rpm range or excellent smooth running is required. An example for such an application are machine tools in which, for example, a carriage is initially quickly advanced at a high speed and subsequently is advanced at a slower speed to its destination.

The electric motor has expediently a cylindrical housing 1 to which is connected a flange 3 with interposition of a thermal insulation 2, preferably an adhesive sleeve. A cooling member 5 with cooling ribs 6 is connected with screws 4 with interposition of a heat conducting coil 7 to the flange 3. A power supply cable 8 is guided into the flange 3. Plates 51–53 with motor specifications are provided.

The flange 3 receives an electronic control device 9 with at least one printed circuit board 10 on which MOSFETs 11 are provided. A motor shaft 12 projects from the housing 1 at the side opposite the flange 3 and supports a rotor 13. The rotor 13 is surrounded by a stator 13. In order to achieve absolute rotor angle information, three Hall sensors 15–17 (FIGS. 4 and 5) are provided and arranged so as to be phase-displaced by 120°. They operate with high resolution. With a suitable algorithm, for detecting maximum and minimum values of the Hall signals, a continuous calibration of the Hall sensor offset values and an amplitude standardization, i.e., a compensation of the amplitude errors, is possible. The analog Hall sensors 15–17 serve as actual value transducers for the commutation, the rpm, and the position.

The electric motor is an EC mini motor which is preferably provided with a bell-shaped armature coil. The digital position and rpm control with sine commutation is integrated into the electric motor. It is also possible to produce triangular and trapezoidal movements with the position control.

The position control will be explained in more detail with the aid of FIG. 4. The program provided for performing the position control mode of the electric motor is saved in a micro controller 18 which is part of the electronic control device 9 in the flange 3. Via an interface 19, preferably a RS 232 interface, the nominal (set point) position of the device to be driven by the motor is predetermined, for example, the position of a carriage of a machine tool. The drive can be configured to very different applications via the interface 19. The adjustments are advantageously memorized in an EEPROM that saves values even after switching off the supply voltage. The entire operation of the unit can be performed via the interface 19. It is possible to supply corresponding commands via a simple ASCII terminal program. For example, the parameters and mode adjustments of the unit can be carried out by a personal computer. It is also possible in practical applications to provide communication from a central control.

The interface 19 supplies the set point position values 20 for the set point position to a comparator 21. It contains the actual position values or signals 22 of the rotor position computing unit 23. When the set point values 20 differ from the actual position values 22, the comparator 21 will supply a corresponding signal to the position control 24. It produces a set point rpm value $n_{set}$ that is sent to a comparator 25. It also contains the actual rpm value $n_{actual}$ of an rpm computation unit 26 which is positioned downstream of the rotor position computing unit 23. The comparator 25 produces a control signal by comparing the set point value and the actual value, and the control signal is then supplied to an rpm control 27. With it, a three-phase sine commutator 28 is controlled having three phases A-C supplied via an output terminal 29 and the MOSFETs 11 to the motor.

The Hall sensors 15–17 detect the rotary angle of the rotor 13 and supply corresponding signals to the rotor position computing unit 23. The calculated rotor angle φ is supplied to the three-phase sine commutator 28 as well as the rpm computing unit 26. In this manner, the rotary angle of the rotor 13 is detected with high resolution and thus with high precision and is optionally readjusted. The three Hall sensors 15–17 are divided into six phases per revolution. The calculation of the rotor angle φ is carried out with the aid of an arc-sine table from two Hall signals which are positioned between 0° and 60°. By weighting functions which are determined from the Hall signals, an average value is determined so that a smooth transition from one to the next phase is achieved. The arc-sine table is determined by recording the Hall signals with a very precise reference impulse sender and a mathematical generation. In this manner it is possible to compensate systematic non-sine shapes of the Hall signals.

A protective unit 30 has correlated therewith a three-phase sine commutator 28 which, for example, protects it against voltage peaks etc. An overvoltage control 31 is provided for preventing voltage increases that would result in a destruction of the electronic components. In the generator operation of the motor, an overvoltage would result in the dc branch of the control when the power supply can not return energy, which is the normal situation. The overvoltage control 31 prevents such voltage increases such that upon reaching a predetermined voltage threshold, the angle φ between the rotor 13 and the rotary field will be adjusted to be less favorable. Accordingly, excess energy is used up during generator operation in the motor as thermal energy. The overvoltage control 31 controls a certain set voltage which is predetermined.

The electronic control device 9 is operated, for example, at a dc voltage at 24 V.

Figure 5:
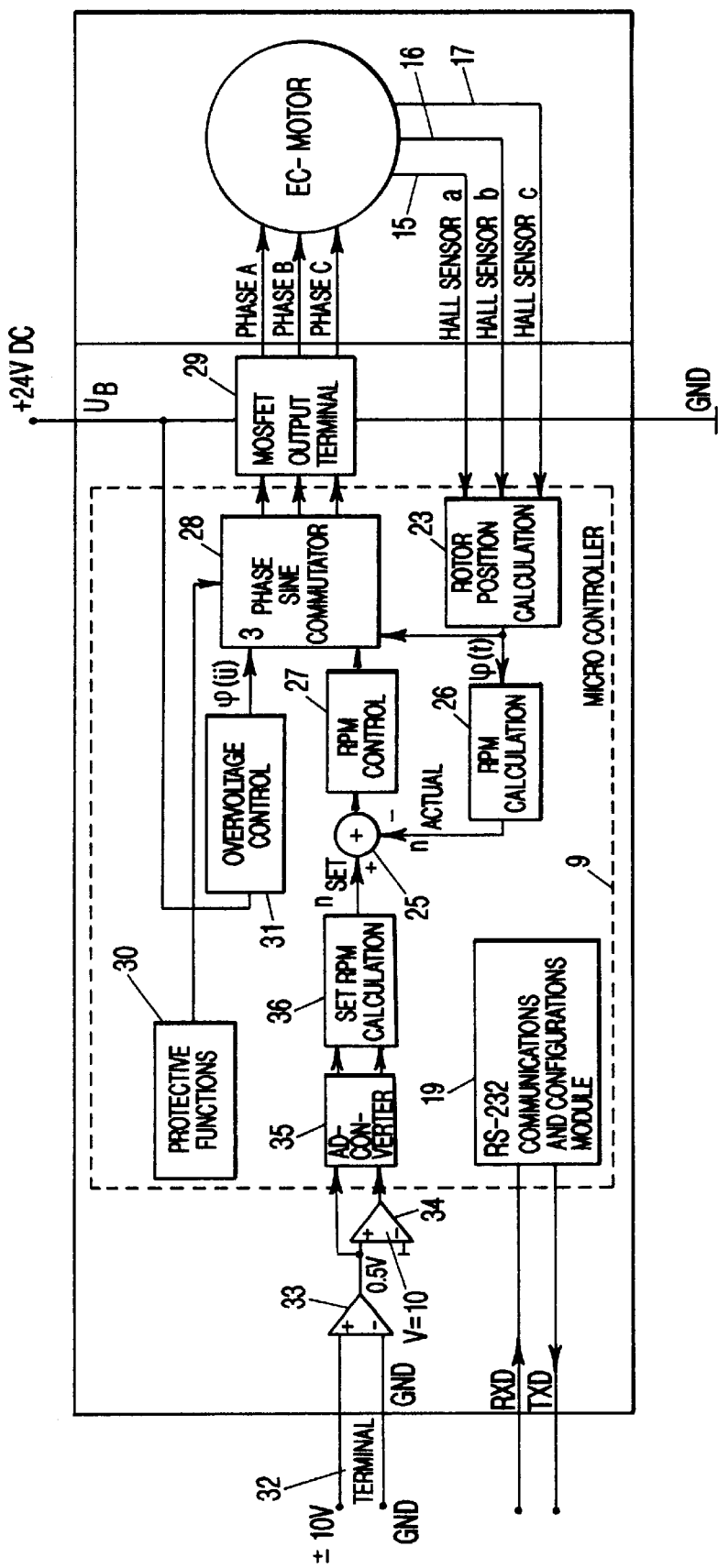
FIG. 5 a block diagram of the rpm control mode of the inventive electric motor.

The electronic control device 9 not only provides position control but also rpm control. The program provided for the rpm control is also loaded into the micro controller (control device) 9. For providing a preset (set point) rpm value, the electronic control device 9 is provided with an analog terminal 32 (FIG. 5). The analog voltage input signal or value supplied for generating the set point rpm values is, for example, in the range of ±10 volt. It is recalculated (reduced) by an analog calculating circuit, preferably an operation summation amplifier 33, to a reduced input value in the voltage range of 0–5 volt. This voltage is then amplified to an amplified input value by the amplifier 34 arranged downstream, wherein amplification is by a factor 10 in the shown embodiment. The signals of the two amplifiers 33, 34 are supplied to an A/D converter 35 which operates preferably at 10 bit. By employing the two amplifiers 33, 34, a wide rpm range can be covered with high resolution. A narrow rpm range for the rotor is a range of approximately up to 100 rpm while a high rpm range of the motor is up to 10,000 rpm. For low rpm, in order to provide high precision, a high resolution is required. An advantage of this method is that for high resolution at low rpm an A/D converter with relatively narrow resolution (10 bit) is sufficient. The digitally converted signals are supplied to a set point rpm computing unit 36 which combines the two digital values to a rpm value $n_{set}$. Instead of the two amplifiers 33, 34 it is possible to employ a logarithmic amplifier which at low rpm of the electric motor increases the resolution. In this case, the logarithmic signals are supplied to an A/D converter. The digitalized signal is subsequently converted by a reversing algorithm (exponential function) to the rpm set point value $n_{set}$. The set point rpm value $n_{set}$ is supplied to the comparator 25 which compares it to the actual rpm value $n_{actual}$. This actual value is supplied to the comparator 25 by the rpm computing unit 26 which is arranged downstream of the rotor computing unit system 23. The set point/actual value comparison results in a control signal that is supplied by the comparator 25 to the PI rpm controller 27 which supplies a corresponding signal to the three-phase sine commutator 28. Via the output terminal 29, the phase signals supplied by the commutator 28 are generated. The Hall sensor 15–17 produce for the phases A-C of the electric motor the corresponding Hall signals which are supplied to the rotor position computing unit 23 as actual value signals.

The signals supplied by the A/D converter 35 are combined in the computing unit 36 by suitable algorithms to the set point rpm value $n_{set}$ with corresponding weighting functions. It is possible to realize for low rpm range a resolution of 2 rpm and for a high rpm range a resolution of 20 rpm. The transition is smooth because of the weighting function even when the components such as the operation amplifier, resistors etc, have errors. Such errors would also result in an rpm offset error. However, this is eliminated by a one time calibration in the micro controller (control device) 9 and by saving in the EEPROM. In the same manner, the scaling factor is also calibrated.

When delivering the electric motor, its integrated position and rpm control is in a standardized adjustment. The analog terminal 32 is adjusted for the rpm control such that by providing an analog voltage between −10 and +10 volt a preadjustment of the rpm set point is possible. This standardized adjustment can be changed at any time via the interface 19 by the client or by the manufacturer before delivery according to the desired specifications. The electric motor can be configured very easily for different applications. These adjustments can be saved in the EEPROM. Also, the entire operation of the electric motor can be performed via the interface 19.

The disclosed electric motor is characterized by a very compact and very simple design. The rpm and position control is integrated into the brushless motor. By controlling the rpm of the motor shaft 12 and its position, it is possible to operate in the disclosed manner over a very wide rpm range with excellent resolution, especially also for low rpm. Due to its small constructive size, the motor can be advantageously mounted in very small mounting spaces. FIGS. 1–3 show a motor at a scale of 2:1. The axial length of the motor including the cooling member 5 with the cooling ribs 6 is approximately 8–10 cm. The diameter of the motor in the area of the cooling member 5 is between approximately 4 and 5 cm, while the motor housing has a diameter of approximately 3–4 cm.

The specification incorporates by reference the disclosure of German priority document 198 15 964.1 of Apr. 9, 1998.

The present invention is, of course, in no way restricted to the specific disclosure of the specification and drawings, but also encompasses any modifications within the scope of the appended claims.

What is claimed is:

1. Electric motor having a coil without iron-core and having an integrated electronic control device (9), wherein said electronic control device (9) has a sine commutator (28) supplying said electric motor with sine-shaped currents or voltages.

2. Electric motor according to claim 1, wherein said control device (9) has an rpm control (25, 27) with which a magnitude of said sine-shaped currents or voltages is preset.

3. Electric motor according to claim 2, wherein said rpm control (25, 27) is integrated into said electric motor.

4. Electric motor according to claim 1, wherein said control device (9) comprises an analog terminal (32) for rpm set point input.

5. Electric motor according to claim 4, wherein said analog terminal (32) has a first amplifier (33) arranged downstream of said analog terminal (32), wherein said first amplifier (32) reduces analog input values to reduced input values.

6. Electric motor according to claim 5, comprising a second amplifier (34) arranged downstream of said first amplifier (33), wherein said second amplifier (34) amplifies said reduced input values to amplified input values.

7. Electric motor according to claim 6, wherein said reduced input values are amplified tenfold.

8. Electric motor according to claim 6, wherein said amplified input values of said second amplifier (34) and said reduced input values of said first amplifier (33) are each supplied to an AND converter (35).

9. Electric motor according to claim 8, wherein said A/D converter (35) has a set point value computing unit (36) arranged downstream thereof which combines the signals of said A/D converters (35) to a rpm set point value ($n_{set}$).

10. Electric motor according claim 4, further comprising a a logarithmic amplifier to which said rom set point input is supplied and subsequently digitalized in an A/D converter with logarithmic reversal by a mathematical algorithm.

11. Electric motor according to claim 1, wherein said sine commutator (28) is a 3-phase sine commutator.

12. Electric motor according to claim 1, wherein said electronic control device (9) has a position control (21, 24, 25) for a motor shaft (12) of said electric motor.

13. Electric motor according to claim 12, wherein said control device (9) has an interface (19) and wherein a set point value for a set point position is entered via said interface (19).

14. Electric motor according to claim 13, wherein said interface (18) is an RS 232 interface.

15. Electric motor according to claim 1, wherein said sine commutator (28) supplies three phase signals (A-C) to an output member (29).

16. Electric motor according to claim 15, wherein said output member (29) is a MOSFET terminal.

17. Electric motor according to claim 15, comprising three analog Hall sensors (15–17) for determining the rpm and/or the position of the motor shaft (12) of said electric motor, wherein said three Hall sensors (15–17) correlate with said three phases (A-C).

18. Electric motor according to claim 17, wherein said Hall sensors (15–17) supply signals to a rotor position computing unit (23) of said control device (9).

19. Electric motor according to claim 1, wherein said control device (9) an overvoltage control (31) connected to said sine commutator (28), wherein said overvoltage control (31) changes the angle ($\phi$) between the rotor (13) of said electric motor and a rotary field.

20. Electric motor having a coil without iron-core and having an integrated electronic control device (9), wherein said electronic control device (9) has a sine commutator (28) supplying said electric motor with sine-shaped currents or voltages, said control device (9) comprising an analog terminal (32) for rpm set point input, said electric motor further comprising a logarithmic amplifier to which said rom set point input is supplied and subsequently digitalized in an A/D converter with logarithmic reversal by a mathematical algorithm.

21. Electric motor having a coil without iron-core and having an integrated electronic control device (9), wherein said electronic control device (9) has a sine commutator (28) supplying said electric motor with sine-shaped currents or voltages, said control device (9) having an overvoltage control (31) connected to said sine commutator (28), wherein said overvoltage control (31) changes the angle between the rotor (13) of said electric motor and a rotary field.

* * * * *